United States Patent
Schmidt et al.

(10) Patent No.: US 9,201,186 B2
(45) Date of Patent: Dec. 1, 2015

(54) LIGHT GUIDE PLATE HAVING EMBEDDED IMPURITIES AND METHOD FOR THE PRODUCTION THEREOF

(75) Inventors: Jann Schmidt, Weiterstadt (DE); Christian Roth, Lautertal (DE)

(73) Assignee: Evonik Röhm GmbH, Darmstadt (DE)

( * ) Notice: Subject to any disclaimer, the term of this patent is extended or adjusted under 35 U.S.C. 154(b) by 0 days.

(21) Appl. No.: 13/319,479

(22) PCT Filed: May 25, 2010

(86) PCT No.: PCT/EP2010/057108
§ 371 (c)(1),
(2), (4) Date: Nov. 8, 2011

(87) PCT Pub. No.: WO2011/000636
PCT Pub. Date: Jan. 6, 2011

(65) Prior Publication Data
US 2012/0067512 A1    Mar. 22, 2012

(30) Foreign Application Priority Data
Jun. 29, 2009 (DE) .......................... 10 2009 027 288

(51) Int. Cl.
*B29C 47/88* (2006.01)
*F21V 8/00* (2006.01)
(Continued)

(52) U.S. Cl.
CPC .......... *G02B 6/0051* (2013.01); *B29C 47/0021* (2013.01); *G02B 6/0065* (2013.01); *B29C 39/00* (2013.01); *G02B 6/0055* (2013.01)

(58) Field of Classification Search
CPC .. G02B 6/0065; G02B 6/0051; G02B 6/0055; B29C 47/00; B29C 47/0021; B29C 59/00; B29C 2791/003; B29C 65/00; B29C 47/0064; B29C 39/00

USPC .................................................... 156/244.19
See application file for complete search history.

(56) References Cited

U.S. PATENT DOCUMENTS

| 6,104,455 A | 8/2000 | Kashima |
| 7,046,903 B2 | 5/2006 | Schmidt et al. |

(Continued)

FOREIGN PATENT DOCUMENTS

| CN | 1804956 | | 7/2006 |
| CN | 1804956 A | * | 7/2006 |

(Continued)

OTHER PUBLICATIONS

International Search Report Issued Sep. 15, 2010 in PCT/EP10/057108 Filed May 25, 2010.
(Continued)

*Primary Examiner* — Philip Tucker
*Assistant Examiner* — Vicki Wu
(74) *Attorney, Agent, or Firm* — Oblon, McClelland, Maier & Neustadt, L.L.P.

(57) ABSTRACT

The invention relates to light guide plates, which are suitable for backlighting LCD monitors as well as information and advertising signs and which are illuminated at the edges and re-emit the light fed at the edges via at least one of the two surfaces located perpendicular to the edges. For the light of a light source that is fed at the edges to be able to leave the light guide plate again via one of the surfaces by overcoming total reflection, the light rays in the light guide plate have to be deliberately deflected. At one of the two surfaces of the light guide plate, the light guide plates are provided with optical impurities (2), which are protected against damage by a film (5). Furthermore, a method for the simplified application of said impurities is provided.

9 Claims, 3 Drawing Sheets

(51) Int. Cl.
  *B29C 47/00* (2006.01)
  *G02F 1/13357* (2006.01)
  *G09F 13/04* (2006.01)
  *B29C 39/00* (2006.01)

(56) References Cited

U.S. PATENT DOCUMENTS

| | | | |
|---|---|---|---|
| 2001/0005441 A1* | 6/2001 | Song et al. | 385/147 |
| 2001/0030861 A1* | 10/2001 | Oda et al. | 362/31 |
| 2002/0141202 A1* | 10/2002 | Liu et al. | 362/558 |
| 2004/0174693 A1* | 9/2004 | Chen et al. | 362/24 |
| 2005/0084993 A1 | 4/2005 | Schmidt et al. | |
| 2006/0103589 A1* | 5/2006 | Chua et al. | 345/3.1 |
| 2008/0165542 A1 | 7/2008 | Kim et al. | |
| 2008/0224339 A1 | 9/2008 | Schmidt et al. | |
| 2009/0040771 A1* | 2/2009 | Greener et al. | 362/330 |
| 2011/0249939 A1 | 10/2011 | Schmidt et al. | |
| 2013/0343088 A1 | 12/2013 | Parusel et al. | |

FOREIGN PATENT DOCUMENTS

| | | | |
|---|---|---|---|
| CN | 101060967 | | 10/2007 |
| CN | 101060967 A | * | 10/2007 |
| CN | 101221254 | | 7/2008 |
| CN | 101231349 | | 7/2008 |
| EP | 1 911 810 | | 4/2008 |
| EP | 2 023 039 | | 2/2009 |
| JP | 06195757 A | * | 7/1994 |
| JP | H6309911 | | 11/1994 |
| TW | 200932499 A | * | 8/2009 |

OTHER PUBLICATIONS

First Office Action issued Apr. 16, 2013, in Chinese patent application No. 201080027040.5 (w/ English translation).
Office Action issued Jan. 27, 2014, in Japanese patent application No. 2012-518058, (English translation of relevant parts only).
Notification of Fourth Office Action issued Mar. 9, 2015 in corresponding Chinese Patent Application No. 201080027040.5. (with English Translation).

* cited by examiner

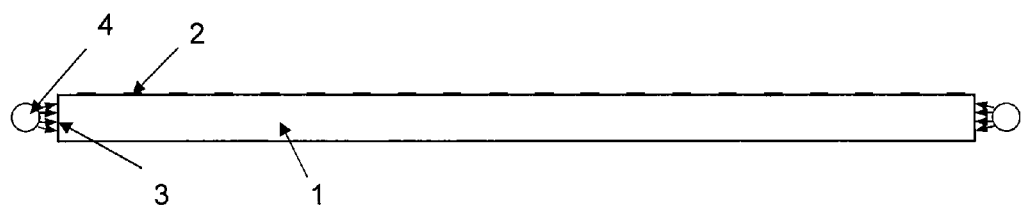
Fig. 1          PRIOR ART
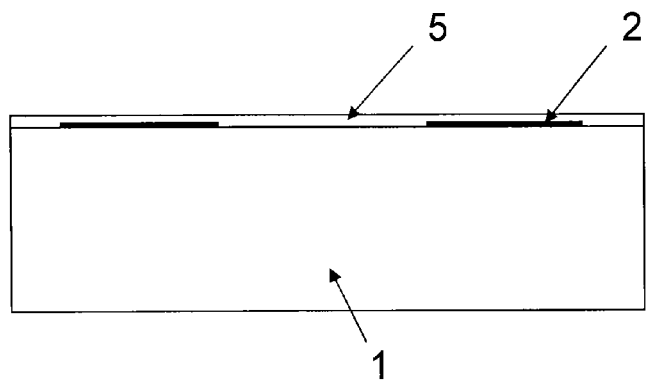
Fig. 2

LIGHT GUIDE PLATE HAVING EMBEDDED IMPURITIES AND METHOD FOR THE PRODUCTION THEREOF

CROSS REFERENCE TO RELATED APPLICATIONS

The present application is a 35 U.S.C. §371 national stage patent application of International patent application PCT/EP10/057108, filed on May 25, 2010, the text of which is incorporated by reference, and claims the benefit of the filing date of German application no. DE10 2009 027 288.7, filed on Jun. 29, 2009, the text of which is also incorporated by reference.

FIELD OF THE INVENTION

Optically conductive sheets are widely used for backlighting for LCD display screens and also for signs and advertising panels; the edges of the sheets are illuminated, and the light input at the edges of the sheets is in turn emitted by way of at least one of the two surfaces perpendicular to the edges (and in this connection see FIG. 1.)

In order that the light which comes from a light source (4) and which is input at the edge (3) of the optically conductive sheet (1) can avoid total reflection and thus can in turn be emitted by way of the surfaces, the light rays have to undergo controlled deflection within the optically conductive sheet. In one widely used method for deflecting the light rays, at least one of the two surfaces of the optically conductive sheet is provided with optical perturbation sites which deflect or scatter incident light in such a way that total reflection can be avoided. Typical perturbation sites (2) used are roughened structures on the surface, engraving on the surface or printing on the surface, e.g. using a pattern of points.

PRIOR ART

A disadvantage of optically conductive sheets with optical perturbation sites applied by printing is that the optical perturbation sites can be damaged by way of example through mechanical action. This then prevents the optically conductive sheet from fulfilling its function of taking light input at the edge and in turn emitting this uniformly by way of surfaces.

The process for equipping the optically conductive sheets with optical perturbation sites according to the prior art is moreover very resource-intensive. Once the transparent panels have been produced, these must first be cut to size and then printed, before the optically conductive sheet can finally be finished by polishing and possibly provision of a mirror finish. In particular, the printing of the panels must by way of example use expensive screen-printing processes, therefore being highly resource-intensive simply in terms of apparatus.

FIG. 1 depicts an optically conductive sheet for use in LCD display screens according to the prior art.

One specific variant in EP 1110029 forms the perturbation sites by applying a pigmented adhesive. Here again the perturbation sites have no protection from abrasion.

EP 1492981 describes printed optical conductors which are composed of a transparent panel and of a print applied thereto, for outdoor applications.

EP 656548 discloses optical conductors which use polymer particles as scattering bodies. A problem with the said sheets is that they give non-uniform luminance distribution.

EP 1022129 moreover discloses optical conductors which have a particle-free, optically conductive layer made of polymethyl methacrylate, to which a diffusive layer has been applied. The thickness of the diffusive layer is in the range from 10 to 1500 µm and it comprises barium sulphate particls. According to this principle, the light is conducted by way of the PMMA layer, and emission here takes place through the diffusive layer. However, it is difficult to control emission of the light since the light that is scattered is only that which is normal to the direction of transmission and which has passed through the boundary layer into the diffusive layer. It is therefore diffuse retroreflection that is happening here, rather than perturbation within the optically conductive layer. There is moreover a very large decrease in luminance as distance from the light source increases.

Low brightness of the light source for the optical conductor according to EP 1022129 leads to high sensitivity to scratching on the light-output area. This scratching can result from mechanical action. A problem here is that the light is scattered by the scratches.

OBJECT

It is an object of the invention to provide a novel optically conductive sheet, or more precisely a novel apparatus for transmitting light, of the type found in the form of backlighting in LCD monitor applications, with properties improved over the prior art.

Another object of the invention is to protect, and thus prevent damage to, the optical perturbation sites (2) that have been applied by printing in order to scatter or deflect the light.

Another object of the invention is to make the typical production process described above for optically conductive sheets more efficient and more cost-effective.

Other objects not explicitly mentioned are apparent from inspection of the entirety of the description, claims and examples below.

BRIEF DESCRIPTION OF THE FIGURES

FIG. 1 illustrates an optically conductive sheet for use in LCD display screens according to the prior art. The apparatus includes a print (2). The light comes from a light source (4) at the edge (3) of the optically conductive sheet (1).

FIG. 2 illustrates an apparatus for transmitting light. The apparatus includes an optically conductive panel (1), a print (2), and a foil (5) to protect the print.

ACHIEVEMENT OF OBJECTS

Figure 3:
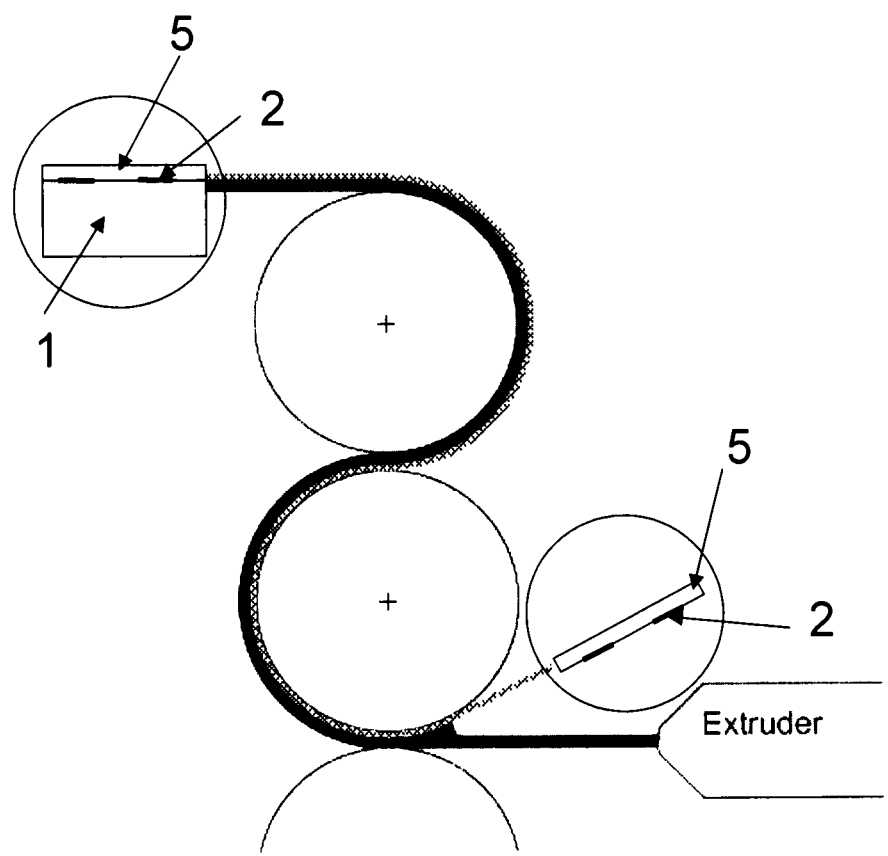
FIG. 3 illustrates a three step process for laminating the printed foil in-line to the optical conductive substrate comprising extrusion or casting with simultaneous lamination, cutting, and finishing, where the last two steps of the process can be also conducted in integrated fashion in one machine.

The objects are achieved by providing a novel apparatus for transmitting light. The said apparatus is composed of one or more light sources (4), of a panel (1) and of a print (2). However, the apparatus according to the invention also has a foil (5) to protect the print. A shown in FIG. 2, the location of the print (2) here is between the panel (1) and the foil (5). The print (2) here is completely enclosed by the panel (1) and the foil (5). This has the advantage that the print (2) has protection not only from abrasion but also from exterior effects, such as moisture, chemicals or the effects of weathering.

The expressions optically conductive sheet and apparatus for transporting light are used synonymously below and indicate the entire apparatus composed of components (1) to (5). The expression panel must not be confused therewith and is defined as meaning exclusively the constituent (1) produced by way of example by extrusion for the optically conductive sheet. As an alternative, the panels can also be produced by way of a casting or continuous casting process.

The expressions perturbation sites and print are likewise used synonymously below.

The panel (1) is composed of a transparent plastic, preferably of acrylic, polycarbonate or a cycloolefin copolymer, and particularly preferably acrylic. The thickness of the panel (1) is from 1 mm to 20 mm, preferably from 2 mm to 10 mm, particularly preferably from 4 mm to 8 mm.

An example of the acrylic preferably used is the acrylic obtainable commercially with trademark PLEXIGLAS® from Evonik Röhm GmbH & Co. KG.

The edges (3) of the panel are illuminated by means of the light source(s) (4), and they therefore function as a light-input area. The light is in turn emitted by way of the light-output area, which is at least one of the two surfaces that are perpendicular to the edges. The expression light-output area here characterizes an area of the optical conductor which is suitable for emitting light. The light-input area is in turn capable of receiving light into the optically conductive sheet, in such a way that the optically conductive layer can distribute the input light over the entire light-output area. The perturbation sites lead to emission of the light in such a way that light is emitted across the entire light-output area.

The print (2) is preferably a pattern of points or of lines. In the use as component of the optically conductive sheet, the said pattern of points serves to produce perturbation sites, and in particular serves to deflect or scatter the light. Uniform illumination of the light-output area can be ensured by optimizing the print.

For the purposes of this specification, a distinction is made between panels and foils. In this context, a foil is a structure which can be rolled up under standard conditions because it has sufficient flexibility. In contrast, a panel is a structure which cannot be rolled up under standard conditions. For the purposes of this specification, the thickness of panels is generally sufficiently great to cause fracture during any attempt at roll-up of the same.

The foils are preferably composed of poly(meth)acrylate. In this context, poly(meth)acrylate means homo- or copolymers of methacrylates and/or or acrylates.

The constituents of the print which assume the function of a printed light-scattering pattern can according to the invention be selected freely, the only restriction thereon being the respective printing process.

A second important aspect of the present invention is the process for producing optically conductive sheets with thickness from 1 mm to 20 mm, preferably from 2 mm to 10 mm, preferably from 4 mm to 8 mm. The said novel production process for optically conductive sheets is more efficient and more cost-effective than the established prior-art processes.

As described above, prior-art production is conducted in four steps of a process: moulding of a thermoplastic to give the panel, cutting to size, application of the perturbation sites to the individual inflexible panels, e.g. by means of a light-scattering print by the screen-printing process, and finishing (polishing, provision of mirror finish, etc.). The respective printing of individual optically conductive sheets is a procedure that proves to be particularly disadvantageous here, because of the amount of time and handling involved.

In contrast, the process according to the invention is markedly more efficient in terms of time and of cost, and also provides protection for the print. This is achieved in that the optical perturbation sites (2) are first printed onto a foil (5). The foil (5) with the printed pattern is then full-surface-laminated to the panel in such a way that the optical perturbation sites (2) become embedded between panel and foil (FIG. 2). This embedding leads to the protection described.

A more detailed description of the process according to the invention is as follows (FIG. 3): in contrast to the prior art, it is composed of only three steps: extrusion or casting with simultaneous lamination, cutting to size, and finishing, where the last two steps of the process can also be conducted in integrated fashion in one machine.

The particularly simple feature of the said process is that the print is first applied in advance, ideally in the form of integral constituent of the production process, to the foil. This markedly increases flexibility in relation to the printing process to be used.

In particular, the print is applied in the form of a light-scattering printed pattern by a low-cost mass-production printing process, for example intaglio roller printing, to a suitable foil (5). The said printed foil is then laminated in-line (FIG. 3) to the optically conductive substrate during the process for producing the optically conductive substrate.

The panels are produced by analogy with the prior art by means of extrusion or of a (continuous) casting process, and initially take the form of a continuous strip of melt. As first step of the process, this strip is bonded to the printed foil downstream of the extruder (A) to give a laminate. No adhesive or adhesion promoter is generally needed here, since when the strip of melt is above the glass transition temperature it gives very good bonding to the foil.

An important factor in the said lamination step is that the location of the print (2) here is between the panel (1) and the foil (5).

Once the printed foil (5) and the melt strand have been bonded to give a laminate, this is passed between two rolls. The foil side here faces towards the leading roll (C). This is a cooled roll, whereas the other roll (B) is only optionally cooled. By way of roll (C) facing towards the foil, the laminate is passed to further rolls (D), similarly optionally cooled.

The cooled laminate made of panel, print and foil can, after cooling, be cut to size and subjected to further finishing. An example of finishing can be polishing of the edges. In order to make better use of the energy input in the form of light, the edge areas not provided with a light source can also be rendered reflective according to the prior art. By way of example, this can be achieved by using reflective adhesive tapes. It is also possible to apply a reflective coating to the said edge areas.

Finally, the edges are equipped according to the prior art with one or more illumination units. The light sources can have been equipped with reflectors in order to improve irradiation of the optical conductor.

The resultant optically conductive sheets and, respectively, the apparatuses according to the invention for transmitting light are preferably used as backlighting in LCD display screens. They can moreover be used as backlighting of signs or of advertising panels.

The example below serves to illustrate, and to improve understanding of, the present invention, without in any way restricting the same.

Example

A pattern of points, composed of circular points of diameter from 0.5 mm to 1.5 mm, with 2 mm separation between the points, is intaglio-printed onto a PMMA foil of thickness 75 micrometers. The printing ink used comprised a white printing ink based on acrylate binder.

Figure 4:
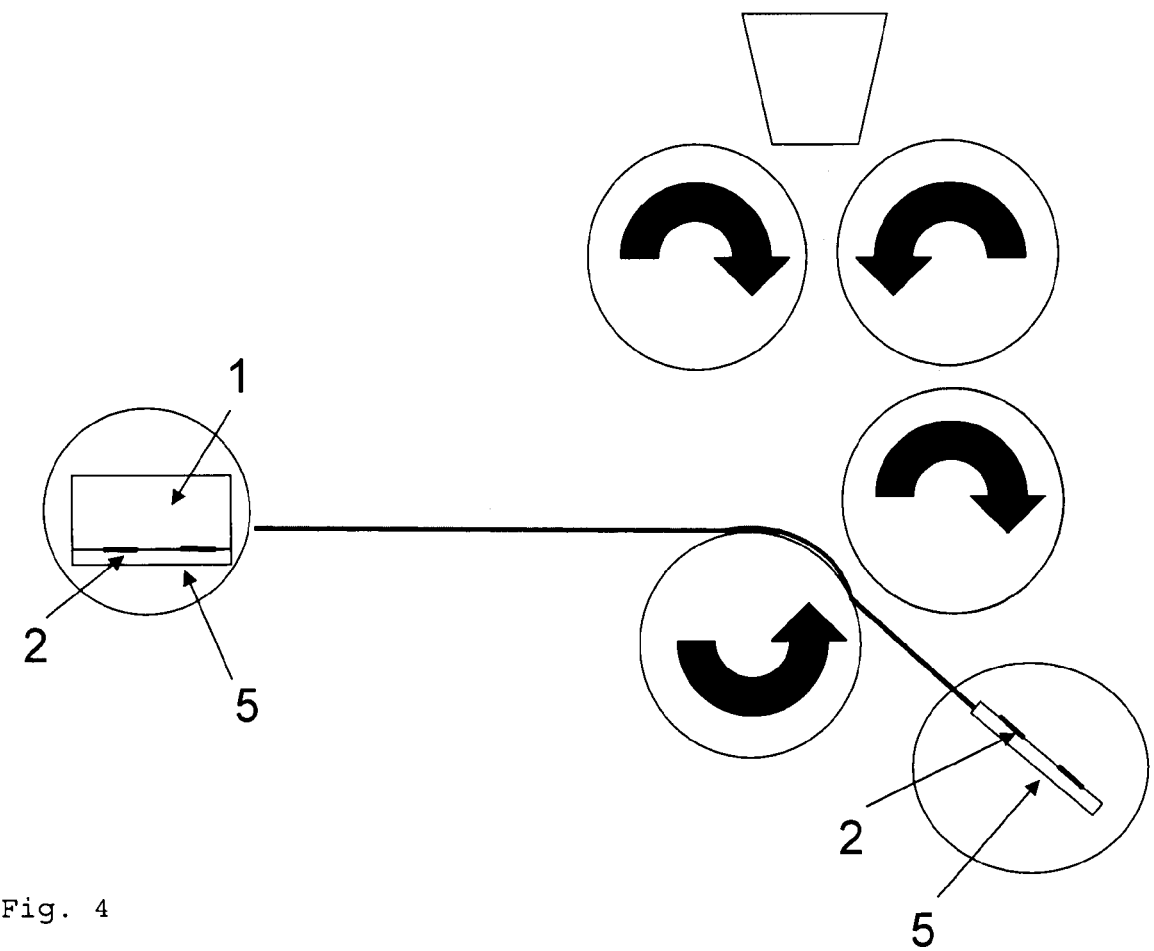
FIG. 4 schematically shows introduction of the printed PMMA foil into a 4-roll calendar, which is brought into contact within the third polishing nip of the calendar, with the extrudate located within the calender. The arrangement of the foil was such that the print on the foil faces towards the extrudate within the calender.

The printed PMMA foil of width 1400 mm and length 1000 m was introduced into a 4-roll calender and, within the third polishing nip of the calendar, brought into contact with the extrudate located within the calender. The arrangement of the foil was such that the print on the foil faces towards the extrudate within the calender. Foil and extrudate were bonded during further passage through the calender and then cooled to give the finished laminate, composed of panel, print and foil (see FIG. 4).

The adhesion between panel and unprinted region of the foil, and also the adhesion between panel and the printed region of the foil, were determined by means of a cross-cut test (DIN EN ISO 2409). The cross-cut values characterizing the bond between panel and unprinted region of the foil and the bond between panel and printed region of the foil were both 0.

The invention claimed is:

1. A process for producing an apparatus comprising:
a panel;
a foil;
a light source; and
a print,
wherein
the panel comprises a transparent plastic having a thickness of from 1 mm to 20 mm, a printed foil, comprising the foil and the print, is full-surface-laminated to the panel, a location of the print is between the panel and the foil,
an edge of the panel can be illuminated, and
light is in turn emitted through a surface that is perpendicular to the edge,
the process comprising:
bonding the foil comprising the print, during an extrusion or casting, to the panel,
wherein a location of the print is between the panel and the foil, thereby producing an apparatus wherein the print is completely enclosed by the panel and the foil,
wherein at the time of the bonding of the panel to the foil comprising the print, the panel is present in the form of a continuous strip of melt above the glass transition temperature.

2. The process of claim 1, wherein the bonding is downstream of an extruder with a melt strand, to give a laminate, and then is passed between rolls, wherein at least the roll facing towards a foil side is a cooled roll.

3. The process of claim 1, further comprising: cooling, to obtain a cooled laminate comprising the panel, the print, and the foil, then cutting the cooled laminate and subjecting to further finishing.

4. The process of claim 1, wherein an edge of the panel comprises a reflective layer.

5. The process of claim 1, wherein the panel comprises an acrylic plastic.

6. The process of claim 1, wherein the panel comprises a polycarbonate plastic.

7. The process of claim 1, wherein the panel comprises a cycloolefin copolymer.

8. The process of claim 1, wherein the panel has a thickness of from 2 mm to 10 mm.

9. The process of claim 1, wherein the bonding is conducted without the use of an adhesive or an adhesive promoter.

* * * * *